(12) United States Patent
Reichler

(10) Patent No.: US 7,993,095 B2
(45) Date of Patent: Aug. 9, 2011

(54) MOBILE SPLIT PALLETIZER

(75) Inventor: John R. Reichler, Lancaster, PA (US)

(73) Assignee: Graham Packaging Company, L.P., York, PA (US)

( * ) Notice: Subject to any disclaimer, the term of this patent is extended or adjusted under 35 U.S.C. 154(b) by 346 days.

(21) Appl. No.: 12/261,532

(22) Filed: Oct. 30, 2008

(65) Prior Publication Data
US 2010/0111663 A1    May 6, 2010

(51) Int. Cl.
*B65G 57/24* (2006.01)
*B65G 57/00* (2006.01)

(52) U.S. Cl. ............... 414/789.6; 414/791.6; 414/789.5; 414/927; 414/799

(58) Field of Classification Search ............ 104/89, 104/91; 248/646; 29/701; 414/626, 788, 414/789.5, 789.8, 791.1, 791.4, 791.6, 791.7, 414/792.6, 792.8, 792.9, 793, 793.1, 799, 414/923, 927–929
See application file for complete search history.

(56) References Cited

U.S. PATENT DOCUMENTS

| | | | |
|---|---|---|---|
| 3,578,281 A * | 5/1971 | Nielsen et al. | 248/346.03 |
| 3,844,422 A * | 10/1974 | Smith et al. | 414/789.9 |
| 3,954,190 A | 5/1976 | Howard et al. | |
| 4,162,016 A | 7/1979 | Schmitt | |
| 4,239,433 A | 12/1980 | Hanson | |
| 4,316,693 A | 2/1982 | Baxter et al. | |
| 4,498,573 A | 2/1985 | Anderson et al. | |
| 4,978,275 A * | 12/1990 | Reid et al. | 414/789.5 |
| 5,188,211 A | 2/1993 | Ringot et al. | |
| 5,336,042 A * | 8/1994 | Winski et al. | 414/789.5 |
| 5,395,209 A | 3/1995 | Busse et al. | |
| 5,539,975 A * | 7/1996 | Kukuljan et al. | 29/701 |
| 6,089,819 A | 7/2000 | Barnes | |
| 6,234,087 B1 | 5/2001 | Brown | |
| 6,431,817 B1 * | 8/2002 | Simkowski | 414/796.9 |
| 6,446,560 B1 * | 9/2002 | Slocum | 104/88.03 |
| 6,625,859 B2 | 9/2003 | Hemmele et al. | |
| 6,658,816 B1 * | 12/2003 | Parker et al. | 53/397 |
| 7,156,605 B1 * | 1/2007 | Hadley et al. | 414/782 |

(Continued)

OTHER PUBLICATIONS

Columbia Palletizing Innovations "Choosing an Automatic Palletizing Solution to Fit Your Needs" Mar. 2005 and Palletizer Glossary—Columbia Palletizing, Columbia Machine, Inc.—Retrieved from the Internet on Oct. 12, 2008: <URL:http://www.palletizing.com/glossary.php (6 pages).

(Continued)

*Primary Examiner* — Gregory W Adams
(74) *Attorney, Agent, or Firm* — Stradley Ronon Stevens & Young, LLP

(57) ABSTRACT

A modular split palletizer for loading layers of articles on stackable pallets. The palletizer has a frame supporting first, second, and third sections. The first section includes a layer build area and a first portion of a stacker transfer track. The second section includes a tier sheet bin, a top frame bin, and a second portion of the track. The third section includes a pallet build area and a third portion of the track. Each of the first, second, and third sections can be disassembled, moved individually and independently, and re-assembled at a new location to form the complete palletizer. Also disclosed is a method of relocating the modular split palletizer. With the palletizer at one location, the utilities connected to the palletizer are disconnected, the fasteners holding the sections together are released, and the sections are separated. The disassembled sections are moved to the new location and reassembled.

20 Claims, 5 Drawing Sheets

U.S. PATENT DOCUMENTS

| | | | |
|---|---|---|---|
| 2002/0064449 A1* | 5/2002 | Vincent et al. | 414/796.5 |
| 2005/0247026 A1* | 11/2005 | Griggs et al. | 53/131.4 |
| 2006/0090419 A1* | 5/2006 | Chrisman et al. | 53/64 |
| 2007/0022715 A1* | 2/2007 | Wegner et al. | 53/396 |

OTHER PUBLICATIONS

"Economical Palletizing Solutions Ideal for Automatic and Manual Operations" Conveying Industries, Inc.—Retrieved Oct. 12, 2008 using Internet <URL: http://www.conveyind.com (2 pages).

"Bulk Palletizing Plastic Containers. Made Easy" Dyco Inc. Product Line—Retrieved from the Internet on Oct. 12, 2008 <URL http://www.dyco-inc.com/pages/palletizing-depalletizing.asp (6 pages).

PASCO Robotic Palletizers and Bag, Case & Pail Palletizing Systems "Manufacturing Solutions for all your material handling needs."—Retrieved from the Internet Oct. 12, 2008: <URL: http://www.pascosystems.com/index.html (1 page).

Palletizers by TopTier: The Original Affordable Palletizer—Retrieved from the Internet Oct. 12, 2008: <URL:http://www.toptier.com (2 pages).

* cited by examiner

MOBILE SPLIT PALLETIZER

TECHNICAL FIELD

The present invention relates generally to article handling systems and, more particularly, to a method and apparatus for loading layers of articles on stackable pallets.

BACKGROUND OF THE INVENTION

The transfer and distribution of goods is expensive in both time and manpower, and contribute to the cost of goods. Pallets used in combination with the forklift have produced substantial economies in the movement of goods by providing many different goods with a similar interface, allowing mechanization and unitization of goods. Nevertheless, the pressure to reduce the cost of supplying goods continues to drive a search for improvements in distribution.

Industrial article handling systems are well known for stacking layers of articles on a pallet. The articles may be cans, containers, bottles, cases, drums, crates, bags, boxes, and many other types of articles. Article handling systems that stack layers of articles on a pallet to load the pallet generally are known as palletizers (i.e., a "palletizer" is a pallet-loading machine). What is needed is a pallet system that facilitates the trend of reduced distribution cost and broadens the class of users who can take advantage of the new economies of distribution.

Conventional manual palletizers require significant worker interaction. The function of the manual machine is to eliminate lifting; the worker controls the movement of the article. In contrast, a fully automated palletizer may only require the user manually to place empty pallets, or to fill hoppers or carton magazines and the like. Many automatic palletizers load entire layers of articles at once.

There are several reasons why a user might choose to palletize a packaging line automatically. First, automatic palletizers do a better job of stacking a load and, therefore, reduce damages to articles during transit. Product damage during shipment or within automatic storage and retrieval systems (AS/RS systems) caused by irregular loads is now part of the payback analysis to justify a palletizer. Second, automatic palletizers avoid many employment-related issues. For example, it is challenging to retain employees in low-wage, low-prestige positions such as those encompassing manual palletizing. The United States Occupational Safety and Health Administration (OSHA) standards regarding weight and repetitive motion limitations can be difficult to follow. And job-related back injuries are costly and can increase a company's insurance premiums. Third, production speeds in some packaging lines are past the point where articles can be hand stacked. Finally, a new generation of low-price, small foot print palletizers are on the market. These systems make it an easier investment decision even for slow-speed lines. All of these reasons justify automating a palletizing operation.

Automatic palletizers can be grouped into one of two main technologies: traditional or robotic. In turn, traditional automatic palletizers break down into two main categories based on how articles enter the machines. First, low-level traditional palletizers intake a continual flow of articles at ground level. Although fast, low-level traditional palletizers are not best for fragile items. Second, high-level traditional palletizers are similar to their low-level counterparts. They do not handle fragile items well, but they intake and load a continual flow of articles quickly. The difference is that high-level traditional palletizers intake from an elevated hopper.

A traditional palletizer arranges the articles that are delivered by a conveyor into a given pattern onto a stripper plate and places the patterned layer onto the pallet. Traditional palletizers can have low speeds or high speeds. As an example, a low-speed palletizer might stack 1-10 cases per minute while a high-speed palletizer might stack over 150 cases per minute. Both low-speed and high-speed traditional palletizers can have a floor-level infeed, fixed at three feet, or a high-level infeed fixed at ten feet. In general, if the production requirement is high speed, a traditional palletizer is the most likely solution.

In contrast to their traditional counterparts, robotic palletizers pick up, manipulate, and load single articles at a time. Robotic palletizers often cost more than traditional palletizers. On the other hand, robotic palletizers are advisable for fragile articles. A robotic palletizer uses an end effector (or gripper) to pick-up the article that is delivered by the conveyor and place the article onto the pallet. Robotic palletizing solutions come in four basic designs: Cartesian (the Cartesian coordinate system is used to determine each point uniquely in a plane through two numbers, usually called the x-coordinate or abscissa and the y-coordinate or ordinate of the point), SCARA (Selective Compliant Assembly Robot Arm), articulating arm, and gantry (a crane having a hoist fitted in a trolley for horizontal movement). The most prevalent palletizing robot is the articulating arm. It is the most flexible and allows for the fastest speeds. In general, robotic palletizers are the most flexible palletizing systems.

Palletizers typically are designed to stack as many as 30-40 boxes or other articles on a relatively large pallet Therefore, these systems must be relatively large to accommodate fully stacked pallets—so large, in fact, that they are typically fixed in one location and are not easily moved. Stacks of pallets instead are conveyed to and from the article handling system by dedicated conveyors, which further increase the space requirements of the system. Another problem associated with standard palletizers is that they are poorly suited for rapidly handling a relatively small numbers of articles. Consequently, palletizers used in these applications must routinely handle partially loaded pallets with an over-sized system that operates at less than one-third to one-half of its capacity at a considerable waste of space and resources. In summary, conventional palletizers are typically mounted directed to the floor of the plant, are large in size, and may cost on the order of $800,000.

The best palletizing system and the best method of palletizing is the one that takes advantage of the plant constraints at the least delivered cost while requiring the least amount of valuable floor space. For any set of plant conditions, the answer can be different. Among the factors that influence the choice of a palletizing system and method are: (1) production throughput, (2) available space, (3) traffic patterns, (4) distance from the packaging area to the palletizing area, (5) type of secondary packaging, (6) the frequency of changes in the stock keeping unit (or SKU which is a unique identifier for each distinct product and service that can be ordered from a supplier) in each production line, (7) stability requirements of the finished load, (8) whether articles are palletized on a pallet or a slip sheet or as a unitized load, (9) whether stretch wrappers are incorporated in the design, (10) whether any wash-down requirements exist, (11) the number of different products and patterns, and (12) the available AS/RS interface.

Conventional palletizing systems are available from a number of sources. Columbia Machine, Inc. of Vancouver, Wash. and Dyco, Inc. of Bloomsburg, Pa. offer palletizers and palletizer accessories. Conveying Industries, Inc. of Denver, Colo. custom builds palletizers to fit particular application needs. PASCO of St. Louis, Mo. is another custom builder that offers a wide array of palletizers. Some palletizers are adaptable, but these machines differ widely depending on exact application specifications. TopTier, Inc. of Portland, Oreg. manufactures simple palletizers with modular designs for flexibility. They also have palletizers that include stretch wrap capabilities.

Quality palletizers last a long time and refurbish well. Used palletizers are a viable option for saving some capital. The Frain Group of Franklin Park, Ill. and Sigma Packaging of Evansville, Ind. are used-palletizer specialists, offering many palletizers including combination systems. Their prices range from $2,500 to $125,000. Rental palletizer equipment is yet another palletizing option.

To overcome the shortcomings of conventional palletizers, a mobile split palletizer is provided. An object of the present invention is to provide an improved palletizer having the versatility needed to operate in connection with a wide variety of packaging lines and to accommodate various types and sizes of articles. A related object is to provide a palletizer capable of handling relatively small numbers of articles. Another object is to provide a palletizer that can be disassembled, moved, and re-assembled both quickly and easily with minimal manpower. Yet another object is to provide an economical, compact palletizer that saves money and space when installed in a plant or factory. It is still another object of the present invention to provide a palletizer that is tough, easy to use, and reliable.

BRIEF SUMMARY OF THE INVENTION

To achieve these and other objects, and in view of its purposes, the present invention provides a modular split palletizer for loading layers of articles on stackable pallets. The palletizer has a frame. A first section of the palletizer is supported by the frame and includes a layer build area and a first portion of a stacker transfer track. A second section of the palletizer is supported by the frame and includes a tier sheet bin, a top frame bin, and a second portion of the stacker transfer track. A third section of the palletizer is supported by the frame and includes a pallet build area and a third portion of the stacker transfer track. Each of the first, second, and third sections can be disassembled, moved individually and independently, and re-assembled at a new location to form the complete palletizer.

The present invention also provides a method of relocating a modular split palletizer having a first section, a second section, and a third section from a first location to a second location. The method begins with the palletizer at the first location, where the utilities connected to the palletizer are disconnected, the fasteners that hold the sections together are released, and the sections are separated from each other to render the palletizer in its disassembled state. The disassembled sections are then moved to the second location. At the second location, pin guides are aligned between the sections, force is applied to the sections pushing the sections together into tight and precise abutting engagement, the fasteners are inserted and tightened to hold the sections together, and the utilities are re-connected.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
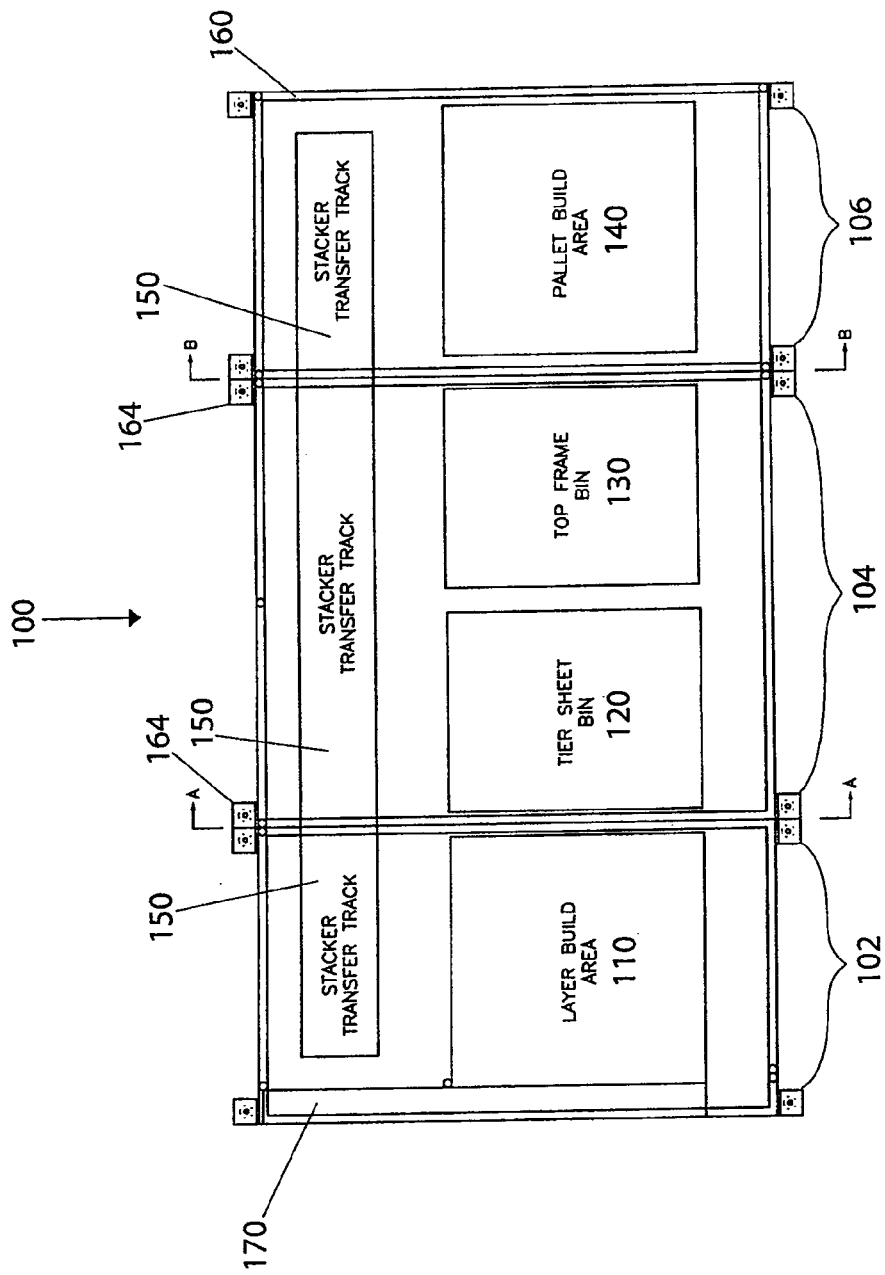
FIG. 1 is a top schematic view of the modular split palletizer according to the present invention, depicted in its assembled state.

Referring now to the drawing, in which like reference numbers refer to like elements throughout the various figures that comprise the drawing, FIG. 1 shows the modular split palletizer 100, in a top schematic view, according to the present invention. The palletizer 100 includes a layer build area 110, a tier sheet bin 120, a top frame bin 130, a pallet build area 140, a stacker transfer track 110, and a sub-base or frame 160. The frame 160 is preferably made of steel.

A conveyor 170 delivers the articles 10 to the palletizer 100. The conveyor 170 may be included as part of the palletizer 100. Alternatively, the conveyor 170 may be a component separate from the palletizer 100. The conveyor 170 conveys articles 10 either singly or in single-layer patterns to the palletizer 100. The conveyor 170 may be a belt, chain, or powered roller conveyor, and may be an endless conveyor. The conveyor 170 delivers the articles 10 specifically to the layer build area 110 of the palletizer 100. Push bars, movable stripping plates, and other conventional components may be used to transfer the articles 10 from the conveyor 170 to the layer build area 110.

The palletizer 100 can be split or separated along the lines A-A and B-B of FIG. 1 into three, separate sections 102, 104, and 106. Preferably, section 102 includes the layer build area 110 and, optionally, the conveyor 170. Section 104 includes the tier sheet bin 120 and the top frame bin 130. Section 106 includes the pallet build area 140. Each section 102, 104, and 106 includes a portion of the stacker transfer track 150.

Figure 2:
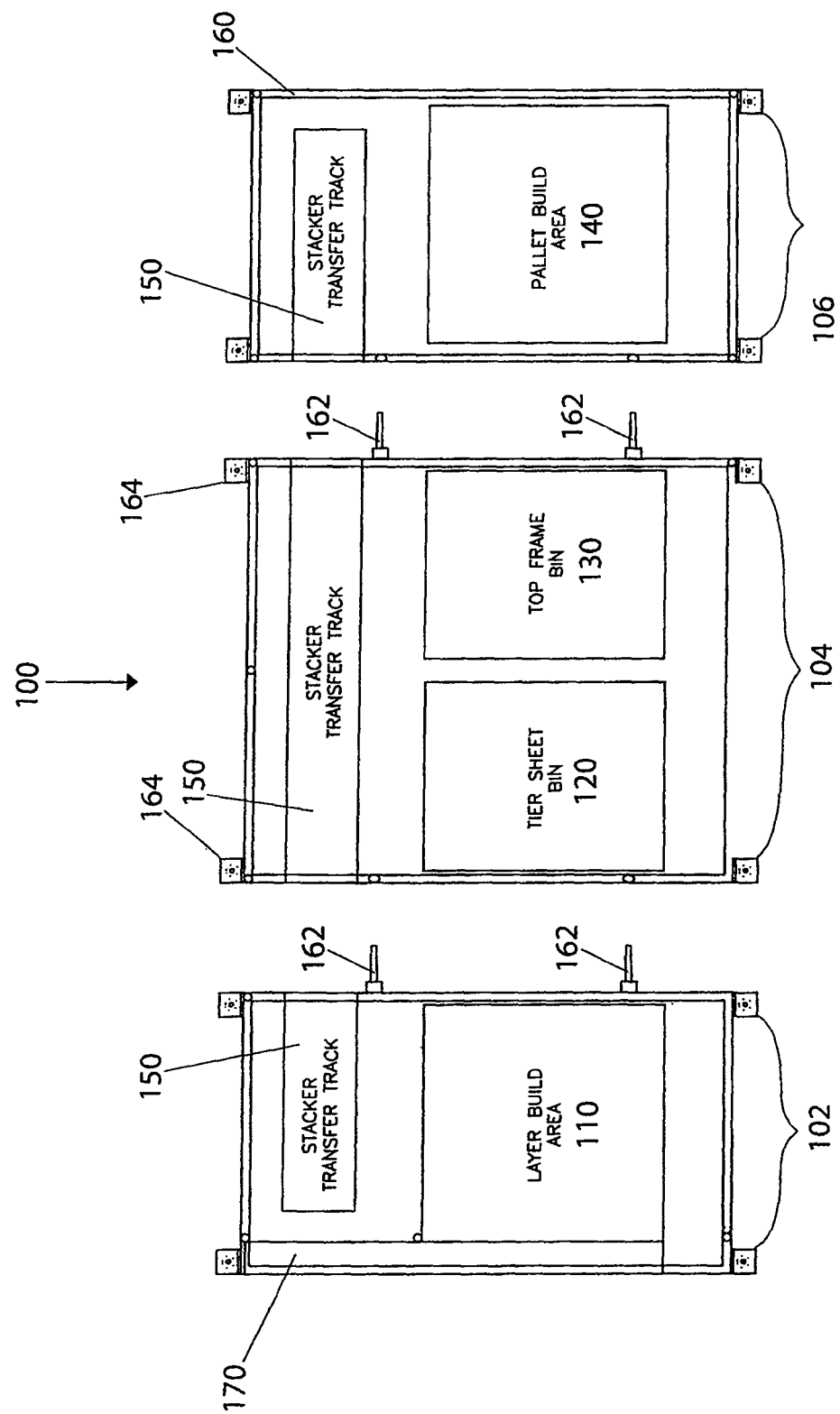
FIG. 2 is a top schematic view of the modular split palletizer of FIG. 1, depicted in its disassembled state.

As shown in FIG. 2, the palletizer 100 has been split or separated into its three sections 102, 104, and 106. A plurality of pin guides 162 are provided on the frame 160 for alignment between the sections 102 and 104 and between the sections 104 and 106, thereby facilitating assembly of the sections 102, 104, and 106 into the compete palletizer 100. The pin guides 162 may include dowel pins. Bolts 164 at the interfaces between the sections 102 and 104 and between the sections 104 and 106 hold the various sections 102, 104, and 106 together. Thus, a combination pin-and-bolt device holds the sections 102, 104, and 106 together in a quick-couple and quick-release manner. Connection mechanisms including fasteners other than bolts 164 could be used instead of the bolts 164, as would be understood by an artisan.

Figure 3:
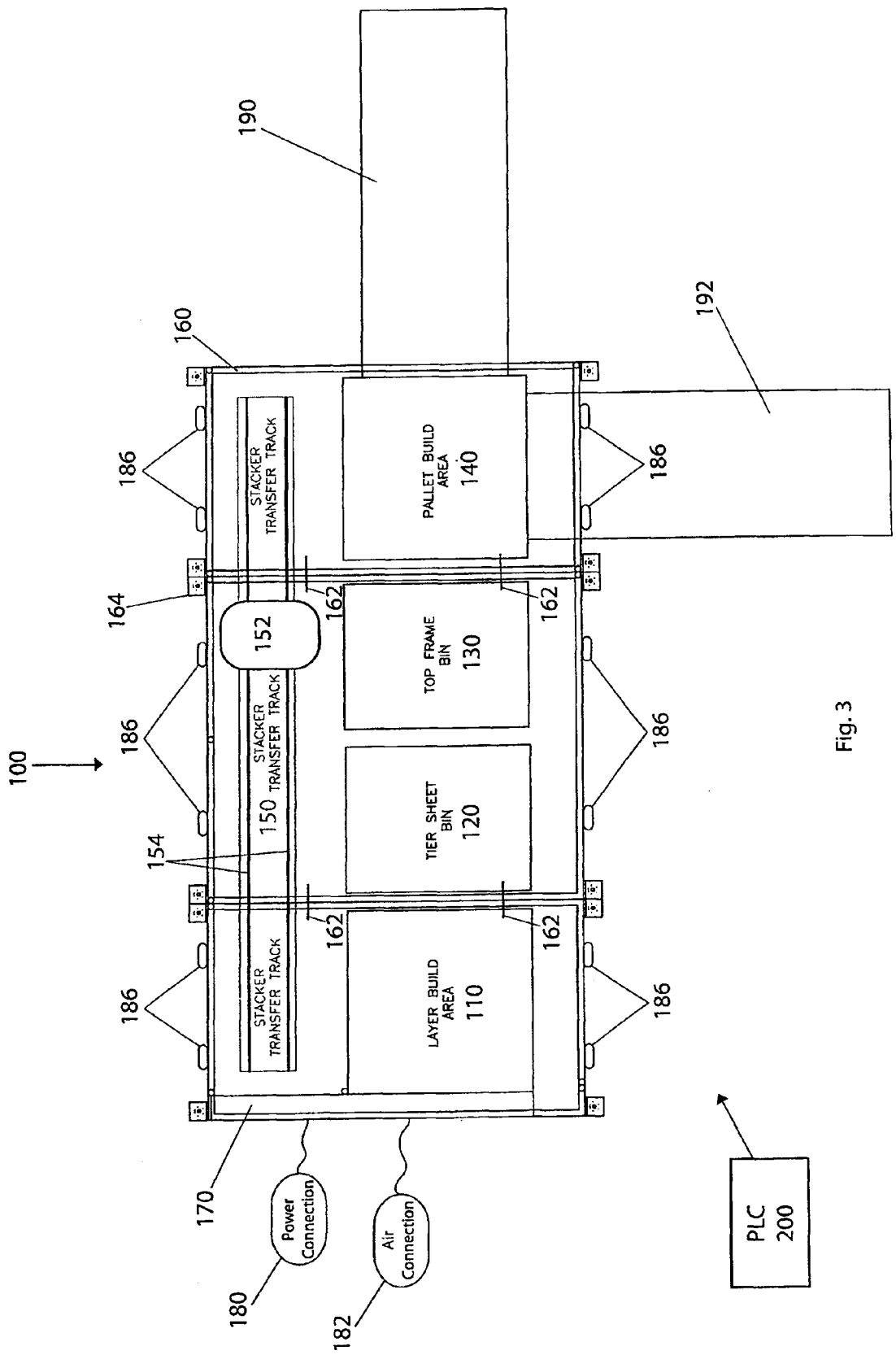
FIG. 3 is a top schematic view of the modular split palletizer of FIG. 1 illustrating additional components and modules.

Utilities are typically associated with the palletizer 100 to deliver electric power, hydraulic fluid, compressed air, and other items to the palletizer 100. As shown in FIG. 3, at least one power connection 180 and one air connection 182 are provided with quick installation to the components of the palletizer 100 assured via quick disconnects. Similarly, plug-type connections (not shown) are provided along the power, hydraulic (if used), and air lines at the junctions between the sections 102 and 104 end between the sections 104 and 106, as needed, to allow complete separation of the sections 102, 104, and 106.

Additional modules can be added to or removed from the palletizer 100 as desired for a particular application. As shown in FIG. 3, for example, a deposit or pallet-loading module 190 and a discharge or pallet-unloading module 192 may be attached to and detached from the palletizer frame 160. Such modules eliminate from the operator the burden of manually delivering empty pallets 20 to the palletizer 100 and removing loaded pallets 20 from the palletizer 100. Instead, such delivery and removal are automatically performed by the pallet-loading module 190 and the pallet-unloading module 192, respectively. New pallets 20 are introduced at the pallet build area 140 while a loaded pallet 20 is being discharged from the palletizer 100.

In one exemplary embodiment, the pallet-loading module 190 includes at least two tabs. The tabs engage the pallets 20 much like the prongs of a fork lift truck. As a result, the tabs lift the pallets 20 in a vertical direction. A robotic arm of the pallet-loading module 190 then transfers the pallets 20 to the pallet build area 140. The tabs move away from the pallets 20 and the pallets 20 are left in place in the pallet build area 140. As a result, pallets 20 can be transferred from the pallet-loading module 190 to the pallet build area 140 automatically. In a similar fashion, the pallet-unloading module 192 may transfer loaded pallets 20 away from the pallet build area 140 automatically.

The palletizer 100 might further comprise a tier sheet feeder (not shown) which automatically feeds tier sheets from the stack of tier sheets, contained in the tier sheet bin 120, onto the previously deposited layers of articles 10. Similarly, a top frame feeder (not shown) can take a top frame from the top frame bin 130 containing a stack of top frames and place the top frame on top of the uppermost layer of articles 10 on the pallet 20. Still additional modules can be added to the palletizer 100, as would be known by an artisan.

The entire palletizer 100 can be moved with the use of wheels 186. The wheels 186 may be attached to the frame 160, as shown in FIG. 3, or provided on a dolly separate from the palletizer 100. The three, separate sections 102, 104, and 106 of the palletizer 100 allow for easy disassembly and re-assembly of the palletizer 100. They also permit the palletizer 100 to be transported most easily: the sections 102, 104, and 106 can be disassembled, moved individually and independently, and re-assembled at a new location to form the complete palletizer 100. Thus, the palletizer 100 can be moved easily from one production line to another (and even from one plant to another).

A stacker (or hoist) 152 runs along or traverses the stacker transfer track 150, which is formed by rods 154. The stacker 152 may include a positive over-travel switch and a negative over-travel switch. Although an electrical stacker 152 is preferred, the stacker 152 may by hydraulically powered. An important aspect of the successful splitting of the palletizer 100 into sections 102, 104, and 106 is to align the rods 154 as perfectly as possible (akin to the prongs of a model railroad track assembly, but on a much larger scale). The rods 154 are separable into portions corresponding substantially to and traversing each of the sections 102, 104, and 106, the rod portions aligning the sections 102, 104, and 106 upon assembly of the sections 102, 104, and 106. The connection between the rods 154 of the various sections 102, 104, and 106 is both tight and precise.

The stacker 152 can use vacuum, mechanical gripping, and compression lifting heads (not shown). The heads are interchangeable to work with different items (such as articles 10) of various sizes and shapes. A programmable logic controller (PLC) 200 automatically dictates the operation of the palletizer 100. Stepper-controlled motors (not shown) also facilitate operations.

In one exemplary embodiment, the stacker 152 has a head with a suction mechanism that includes vacuum cups. The vacuum cups lift a tier sheet from the tier sheet bin 120 and place it on the bulk load in the pallet build area 140. The head of the stacker 152 also has a tier sheet gripper which is actuated by air cylinders. Conventional line air pressure from the plant or factory provides the necessary air pressure to generate vacuum pressure to the cups and the cylinders for lifting tier sheets. The tier sheet gripper holds a tier sheet in place so it will not slide when another tier of articles 10 is being placed on the tier sheet.

The stacker 152 may also have a head with a mechanical gripping mechanism. The grippers of the mechanical gripping mechanism engage the inside perimeter of a top frame and lift the top frame from the top frame bin 130. Air cylinders move the grippers outwardly thereby holding the inside perimeter of the top frame. The stacker 152 rotates to the pallet build area 140 and retracts the grippers, leaving the top frame in place on the bulk stack formed in the pallet build area 140.

In operation of the fully assembled palletizer 100, the conveyor 170 delivers the articles 10 to the palletizer 100. At the layer build area 110, the articles 10 are organized into a patterned layer array suitable for stacking. Once a layer array is assembled, the stacker 152 travels along the track 150 to the left in FIG. 3, lifts the layer array, reverses direction and transports the layer array via movement along the track 150 to the pallet build area 140, and deposits the layer array directly or indirectly on the pallet 20. The stacker 152 then side-shifts over to the tier sheet bin 120 (tier sheets are also called slip sheets or separator sheets), if the layer is not the final layer to be stacked on the pallet 20, or to the top frame bin (top frames are also called top caps), if the layer is the final layer. At the tier sheet bin 120 or the top frame bin 130, the stacker 152 lifts a tier sheet or a top frame from its respective bin and places the tier sheet or the top frame on top of the layer in the pallet build area 140.

The process of obtaining a layer array of articles 10, placing the layer array in the pallet build area 140, obtaining a tier sheet, and placing the tier sheet on the layer array in the pallet build area 140 will be repeated for the number of tiers necessary to complete the load. When the pallet 20 is full with the predetermined number of layers, and with the final layer and top frame in place, the pallet 20 is removed from the palletizer 100. (By "predetermined" is meant determined beforehand, so that the predetermined number of layers must be determined, i.e., chosen or at least known, before the palletizing operation begins.) Thus, layers of pallets 20, tiers of articles 10, tier sheets, and top frames are arranged as desired until a bulk load is finished.

Figure 4:
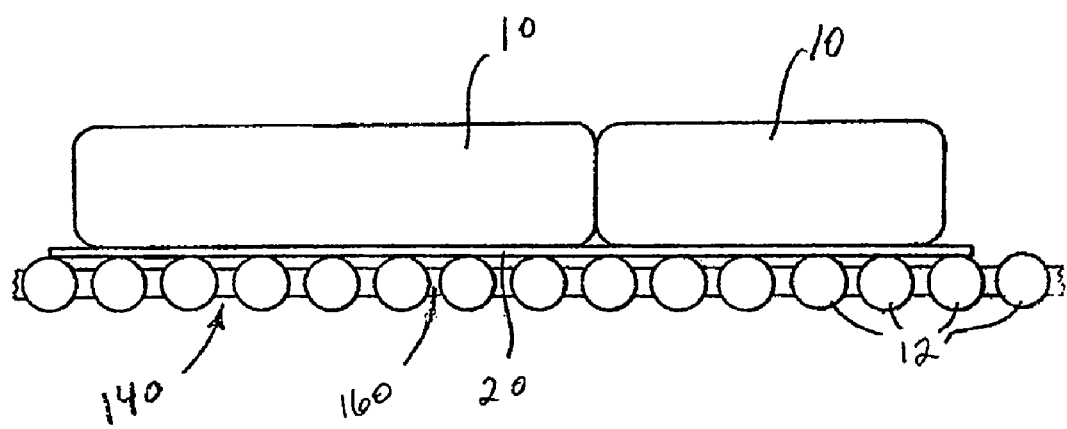
FIG. 4 is a side view illustrating the start of a tier of articles placed on a pallet in the pallet build area of the modular split palletizer.

The start of a tier of articles 10 on a pallet 20 in the pallet build area 140 is illustrated in FIG. 4. The pallet build area 140 defines a substantially flat base and, as illustrated, may have a roller-assisted off-feed. Thus, the pallet build area 140 is formed of a plurality of horizontally extending rollers 12 mounted on the supporting frame 160. The rollers 12 support the pallet 20 upon which the articles 10 are stacked. Filled pallets 20 are removed from the palletizer 100 via the pallet-unloading module 192, which may be attached to and detached from the palletizer frame 160.

If desired, the top frame bin 130 may contain combination pairs of a tier sheet and a top frame so that the cap on the load of articles 10 includes both a tier sheet and a top frame deposited automatically in one step. Individual layers, or the entire palletized stack of layers, may be sealed with a flexible bag, film, or wrap (e.g., of polyethylene). The finished pallet also might also be secured with strapping. The palletizer 100 combines articles 10 into a single unit load automatically and without the use of additional tools.

The tier sheet is typically a corrugated board separator. The pallets 20 are conventional devices, such as those disclosed in U.S. Pat. No. 6,089,819 or U.S. Pat. No. 6,234,087. The dimensions of a typical tier sheet and pallet are on the order of 3 feet by 4 feet. The height of each tier of articles 10 placed on the pallet 20 and separated by a tier sheet is substantially defined by the height of the articles 10.

The connections between sections 102, 104, and 106 are sufficiently tight that jack bolts 14 may be required to disassemble the sections. Thus, jack bolts 14 are incorporated into the palletizer 100 of the present invention to separate the sections 102, 104, and 106 that are normally bolted or fastened together to form the palletizer 100. Jack bolts 14 have been used for many years to aid in separating structures that are assembled and fastened together. Generally, two structures such as two flanges as part of an assembly or, more directly, two structural elements may be fastened together by bolts and nuts or other fasteners. When it is desired to separate the two structural elements, the jack bolt 14 may be used by engaging the screw threads of the jack bolt 14 with a threaded aperture in one assembly element and rotating the jack bolt 14 to apply force against the other assembly element to thereby separate the two assemblies.

Figure 5:
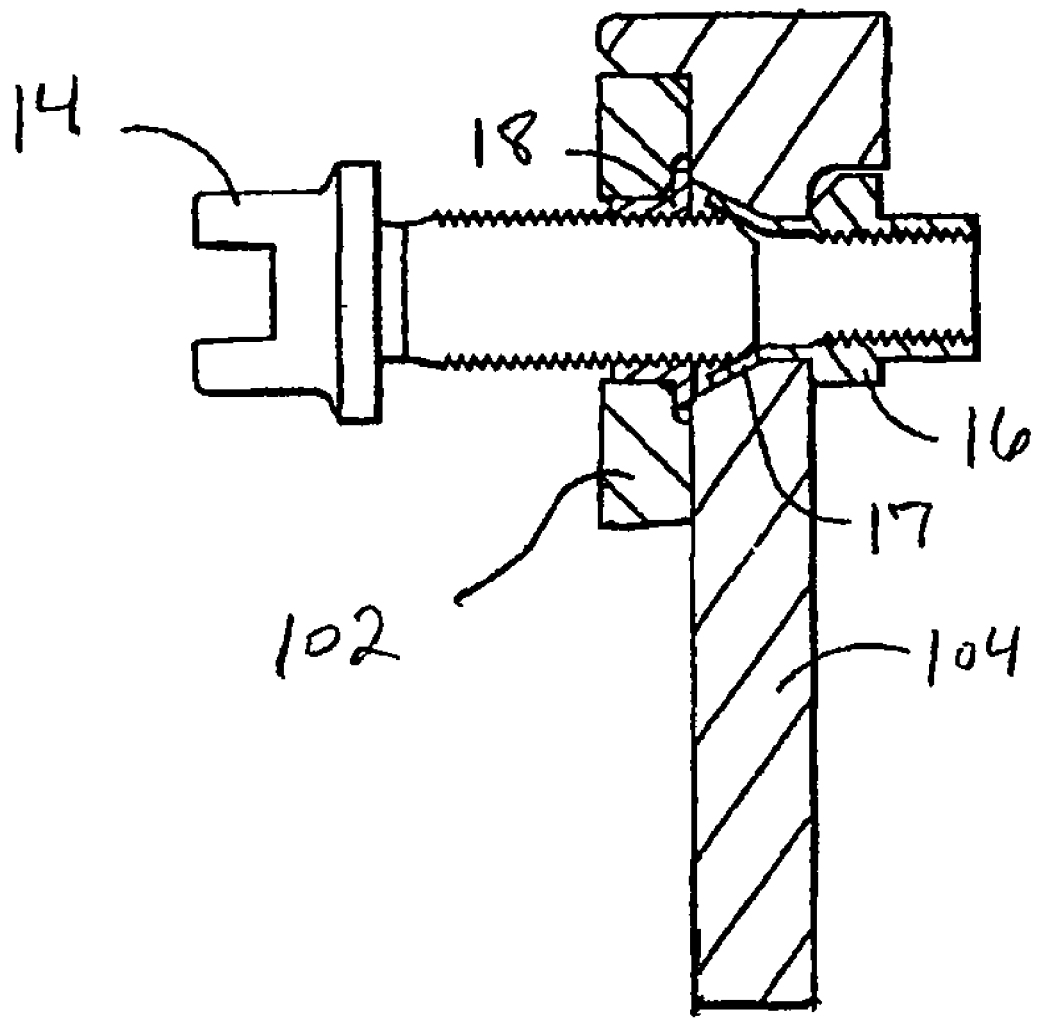
FIG. 5 is a cross-sectional view illustrating the use of a jack bolt in combination with the sections of the modular split palletizer.

FIG. 5 illustrates an example of the use of a jack bolt in combination with the sections 102, 104, and 106 of the palletizer 100. A fastening nut 16 is provided for use with a fastening bolt (not shown). A flange 17 is provided against which the jack bolt 14 may be engaged. The fastening nut 16 may be attached to the frame 160 defining the section 104 (or to the frame 160 defining one of the other sections 102 or 106). A bushing 18 may be fastened to the frame 160 of the opposite section to be attached (in the illustrated example, section 102) through which the jack bolt 14 may be threaded. When the jack bolt 14 is rotated against the flange 17 to separate the sections 102 and 104, the force of the jack bolt 14 may unswage the fastening nut 16.

In normal use the composition of the frame 160 of the two sections 102 and 104 may be such that the force of separation does not cause any deformation of the structure of the assemblies. In some applications, however, there may not be a surface against which the jack bolt 14 may be engaged to force separation of sections 102, 104, and 106. In other applications, a particular structure as for example an aluminum frame 160 may deform under the force applied when a jack bolt 14 is used to separate the sections 102, 104, and 106. In each of these applications, more complex structures such as the jacking plate disclosed in U.S. Pat. No. 6,625,859, incorporated in this document by reference, may be used to reinforce the area that accepts the force of the jack bolt 14 and to protect against deformation of the structure.

The palletizer 100 allows the present invention to include an improved method of relocating a palletizer from one location to another. While the palletizer 100 is at a first location, the operator disconnects utilities, such as the power connection 180 and the air connection 182, using quick disconnects. The operator then removes other external modules and components that engage the palletizer 100 for the particular application needed at the first location. Next, the operator unfastens the bolts 164 that hold the sections 102, 104, and 106 together. Finally, using the jack bolts 14 if necessary, the operator separates sections 102, 104, and 106 from each other.

With the palletizer 100 in its disassembled state, the operator can easily move the sections 102, 104, and 106 to a second location. Relocation of the sections 102, 104, and 106 is completed with the help of the wheels 186. The operator can also move other modules and components, as desired and in a conventional manner, to the second location.

At the second location, the operator can begin the steps of re-assembling the palletizer 100. First, the rods 154 of the stacker transfer track 150 are aligned, as are the pin guides 162 of the frame 160, between the sections 102, 104, and 106. The operator then applies force to the sections 102, 104, and 106, pushing them together into tight and precise abutting engagement. The bolts 164 are inserted and tightened to hold the sections 102, 104, and 106 together. The utilities are re-connected. Finally, other modules and components are added, as desired and in a conventional manner, to the palletizer 100 thus completing relocation of the palletizer 100. As an artisan would recognize, the steps of the method of relocating the palletizer 100 need not be completed in the order outlined above.

Use of the modular split palletizer 100 of the present invention can increase production efficiency by about twenty percent and decrease the number of personnel required to operate the production line. The palletizer 100 is tough, easy to use, reliable, and sufficiently compact to fit into a minimum operating space within a plant or factory—making installation, operation, and maintenance easier. Although it depends on the production line and space allotment available, the overall size of the palletizer 100 is typically about fifteen by thirty feet. The palletizer 100 has the versatility needed to operate in connection with a wide variety of packaging lines and to accommodate various types and sizes of articles 10.

The entire palletizer 100 can be disassembled, moved, and re-assembled both quickly (in three-to-four hours) and easily by four people. The palletizer 100 is a turnkey unit requiring only utility connections to become operational. All components are match-marked to facilitate re-assembly after the components are disassembled and moved.

The cost of the palletizer 100 is about one-quarter the amount of a conventional palletizer; thus, the palletizer 100 may be used on production lines that otherwise could not economically justify use of a palletizer. The palletizer 100 opens up palletizer technology to smaller businesses with low-volume applications (i.e., the palletizer 100 can handle relatively small numbers of articles 10). Given its modular design, the palletizer 100 can be fully converted to accommodate different sizes and shapes of articles 10 using easily removable, quick-change components.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

What is claimed:

1. A modular split palletizer for loading layers of articles on stackable pallets comprising:
    a frame having a first section, a second section, and a third section, wherein each section includes a plurality of pin guides for aligning the sections, and a plurality of quick-couple and quick-release fasteners for holding the sections together and facilitating disassembly and assembly of the palletizer;
    wherein the first section includes a layer build area and a first portion of a stacker transfer track;
    wherein the second section includes a tier sheet bin, a top frame bin, and a second portion of the stacker transfer track;
    wherein the third section includes a pallet build area and a third portion of the stacker transfer track, and
    wherein the second section is positioned between the first section and the third section;
    a power connection and at least one compressed air connection, each connection having a quick disconnect; and,
    a stacker that, during operation of the palletizer, lifts a layer array from the layer build area, traverses the first, second, and third portions of the stacker transfer track and deposits the layer array onto a pallet or onto the top-most layer array on the pallet in the pallet build area, transverses the third and second portions of the stacker transfer track and lifts either a tier sheet from the tier sheet bin or a top frame from the top frame bin, and traverses the second and third portions of the stacker transfer track and deposits the tier sheet or the top frame onto the top-most layer array on the pallet in the pallet build area;
    wherein the assembled palletizer is capable of being quickly disassembled and reassembled at a new location by separating the first, second, and third sections, moving the separate first, second, and third sections individually and independently, and re-assembling the palletizer at the new location.

2. The modular split palletizer according to claim 1 further comprising a conveyor for delivering the articles to the layer build area.

3. The modular split palletizer according to claim 1, further comprising a pallet-loading module for delivering empty pallets to the pallet build area of the palletizer and a pallet-unloading module for removing loaded pallets from the palletizer, the pallet-loading module and the pallet-unloading module releasably attached to and detached from the frame of the palletizer.

4. The modular split palletizer according to claim 1 further comprising a plurality of wheels facilitating movement of each of the first, second, and third sections after disassembly.

5. The modular split palletizer according to claim 1, wherein the stacker transfer track includes at least one rod separable into portions corresponding substantially to and traversing each of the first, second, and third sections, the rod portions aligning the sections upon assembly of those sections.

6. The modular split palletizer according to claim 1, further comprising at least one jack bolt for facilitating disassembly of the first, second, and third sections.

7. The modular split palletizer according to claim 1, wherein the fasteners are bolts.

8. A modular split palletizer for loading layers of articles on stackable pallets comprising:
    a frame having a first section, a second section, and a third section, wherein each section includes a plurality of pin guides for aligning the sections, and a plurality of quick-couple and quick-release fasteners for holding the sections together and facilitating disassembly and assembly of the palletizer;
    wherein the first section includes a layer build area and a first portion of a stacker transfer track;
    wherein the second section includes a tier sheet bin, a top frame bin, and a second portion of the stacker transfer track; and
    wherein the third section includes a pallet build area and a third portion of the stacker transfer track,
    at least one power connection and at least one compressed air connection, each connection having a quick disconnect;
    a plurality of wheels, and
    a stacker that, during operation of the palletizer, lifts a layer array from the layer build area, traverses the stacker transfer track and deposits the layer array onto a pallet or onto the top-most layer array on the pallet in the pallet build area, transverses the stacker transfer track and lifts either a tier sheet from the tier sheet bin or a top frame from the top frame bin, and traverses the stacker transfer track and deposits the tier sheet or the top frame onto the top-most layer array on the pallet in the pallet build area;
    wherein the assembled palletizer is capable of being quickly disassembled and reassembled at a new location by separating the first, second, and third sections, moving the separate first, second, and third sections individually and independently using the plurality of wheels, and re-assembling the palletizer at the new location.

9. The modular split palletizer according to claim 8, further comprising a conveyor for delivering the articles to the layer build area.

10. The modular split palletizer according to claim 8, further comprising a pallet-loading module for delivering empty pallets to the pallet build area of the palletizer and a pallet-unloading module for removing loaded pallets from the palletizer, the pallet-loading module and the pallet-unloading module releasably attached to and detached from the frame of the palletizer.

11. The modular split palletizer according to claim 8, wherein the stacker transfer track includes at least one rod separable into portions corresponding substantially to and traversing each of the first, second, and third sections, the rod portions aligning the sections upon assembly of those sections.

12. The modular split palletizer according to claim 8 further comprising at least one jack bolt facilitating disassembly of the first, second, and third sections.

13. The modular split palletizer according to claim 8, wherein the second section is positioned between the first section and the third section.

14. The modular split palletizer according to claim 8, wherein the fasteners are bolts.

15. A method of quickly relocating an assembled modular split palletizer according to claim 1, the method comprising:
    with the assembled palletizer at the first location, disassembling the assembled palletizer by disconnecting utilities connected to the palletizer, releasing the fasteners that hold the sections together, and separating the sections from each other to render the palletizer in a disassembled state;
    moving the separated sections to the second location; and
    at the second location, re-assembling the palletizer by aligning pin guides between the sections, applying force to the sections pushing the sections together into tight and precise abutting engagement, inserting and tightening the fasteners to hold the sections together, and re-connecting the utilities.

16. The method according to claim 15 wherein the utilities are disconnected and re-connected using quick disconnects.

17. The method according to claim 15 further comprising the step of applying jack bolts to separate the sections from each other.

18. The method according to claim 15 wherein the step of moving the sections to the second location is completed with the help of wheels.

19. The method according to claim 15 further comprising the step, commensurate with the step of aligning the pin guides between the sections, of aligning the rods of a stacker transfer track.

20. The method according to claim 15 further comprising the steps of disengaging at least one external module or component from the palletizer at the first location, and placing at least one external module or component into engagement with the palletizer at the second location.

* * * * *